US00RE45460E

(19) United States
(12) Reissued Patent
Jiang

(10) Patent Number: US RE45,460 E
(45) Date of Reissued Patent: Apr. 14, 2015

(54) WATER CLOSET

(71) Applicant: Kohler Co., Kohler, WI (US)

(72) Inventor: Mimi Jiang, Shanghai (CN)

(73) Assignee: Kohler Co., Kohler, WI (US)

(21) Appl. No.: 29/438,425

(22) Filed: Nov. 29, 2012

Related U.S. Patent Documents

Reissue of:
(64) Patent No.: Des. 628,279
Issued: Nov. 30, 2010
Appl. No.: 29/340,165
Filed: Jul. 14, 2009

(51) LOC (10) Cl. ..... 23-02
(52) U.S. Cl.
USPC ..... D23/301
(58) Field of Classification Search
USPC ..... D23/273, 274, 295, 301, 203, 309, 313; 4/300, 329, 353, 420
See application file for complete search history.

(56) References Cited

U.S. PATENT DOCUMENTS

| | | | | | |
|---|---|---|---|---|---|
| D411,437 | S | * | 6/1999 | Thompson | D8/377 |
| D424,181 | S | | 5/2000 | Caplow | |
| D471,621 | S | | 3/2003 | Bennie | |
| D472,619 | S | * | 4/2003 | Kawamura et al. | D23/301 |
| D521,617 | S | * | 5/2006 | Hou | D23/301 |
| D528,194 | S | * | 9/2006 | Hou | D23/301 |
| D532,875 | S | * | 11/2006 | Kaule | D23/301 |
| D541,915 | S | | 5/2007 | Bates | |
| D542,390 | S | | 5/2007 | Bates | |
| D542,396 | S | | 5/2007 | Bates | |
| D594,535 | S | * | 6/2009 | Bucher | D23/301 |
| D594,942 | S | * | 6/2009 | Slothower et al. | D23/295 |
| D603,945 | S | * | 11/2009 | Bucher | D23/301 |

OTHER PUBLICATIONS

Kohler Archer Comfort Height Toilet; K-3157; Kohler Catalog; 1 page.
Kohler Kathryn Two-Piece Toilet; 1 page.
Kohler Kathryn Comfort Height One-Piece Toilet; Model No. K-3324; HomePortfolio.com online catalog; copyright 1997-2008 HomePortfolio Inc.; 1 page.
Kohler Kallista Kalligraphos Toilets; Kallista Catalog; 1 page.
Kohler. Archer Comfort Height Toilet. K-3517. Kohler catalog.
Kohler. Kathryn Two-Piece Toilet.

* cited by examiner

*Primary Examiner* — Phillip S Hyder
(74) *Attorney, Agent, or Firm* — Foley & Lardner LLP

(57) CLAIM

The ornamental design for a water closet, as shown and described.

DESCRIPTION

FIG. 1 is a left, top, front perspective view of a water closet embodying my new design;
FIG. 2 is a top plan view thereof;
FIG. 3 is a front elevational view thereof;
FIG. 4 is a left side elevational view thereof;
FIG. 5 is a right side [elevation] *elevational* view thereof;
FIG. 6 is a rear elevational view thereof; and,
FIG. 7 is *a* bottom plan view thereof.

The broken line representations in the figures are for the purpose of illustration only, and form no part of the claimed design. *The dot-dash-dot lines are intended to illustrate unclaimed borders of claimed surfaces, and form no part of the claimed design.*

In a preferred embodiment, the nature of this product is a plumbing fixture in the form of a water closet, which is primarily useful for receiving the liquid and solid waste of humans.

1 Claim, 4 Drawing Sheets

Figure 2:
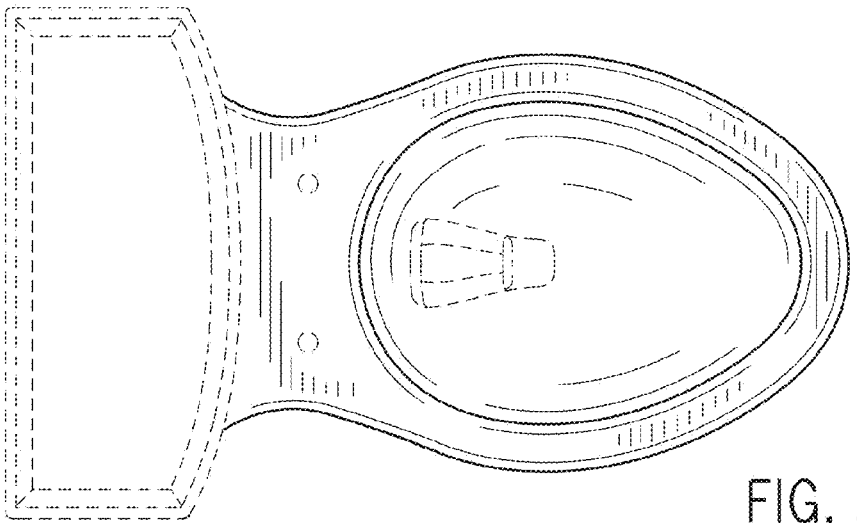
Figure 6:
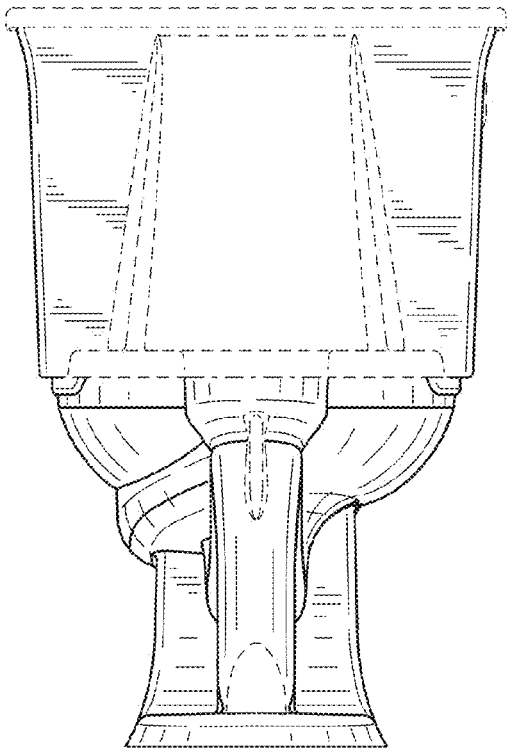
Figure 7:
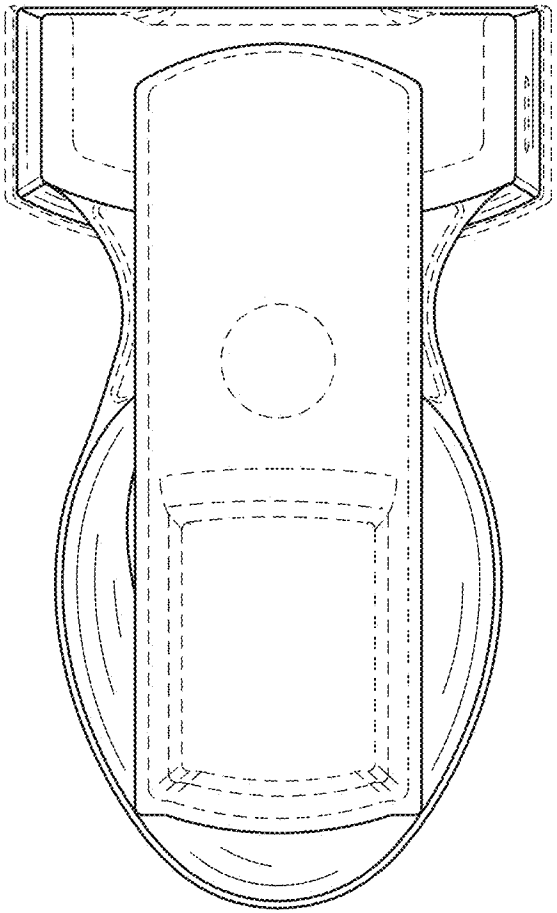

Matter enclosed in heavy brackets [ ] appears in the original patent but forms no part of this reissue; matter printed in italics indicates the additions made by reissue.

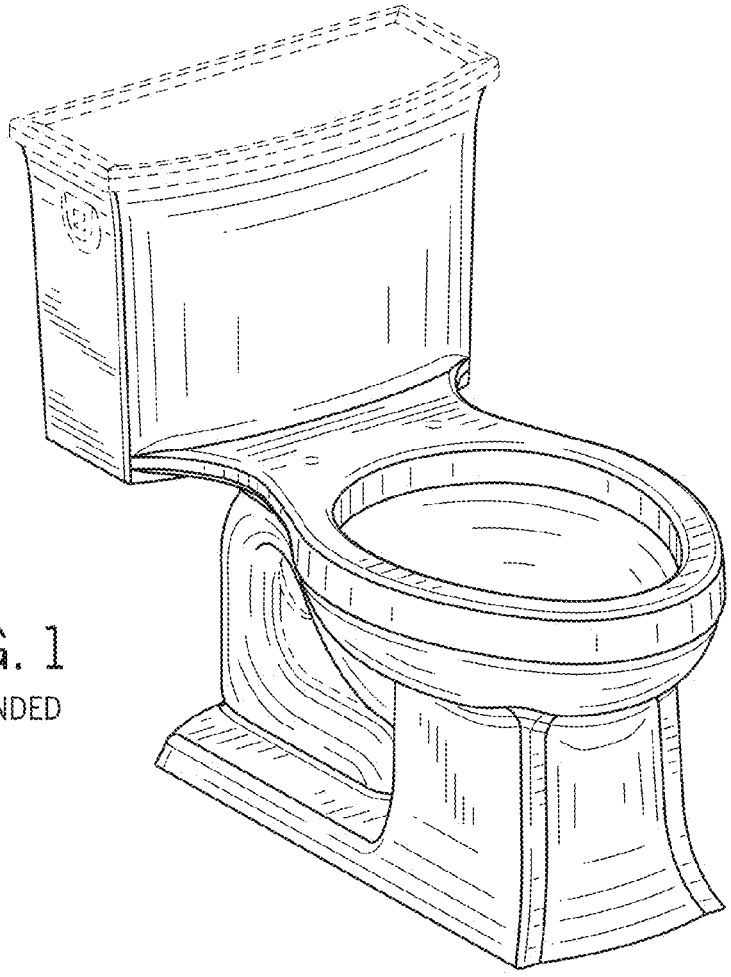
FIG. 1
AMENDED

FIG. 3
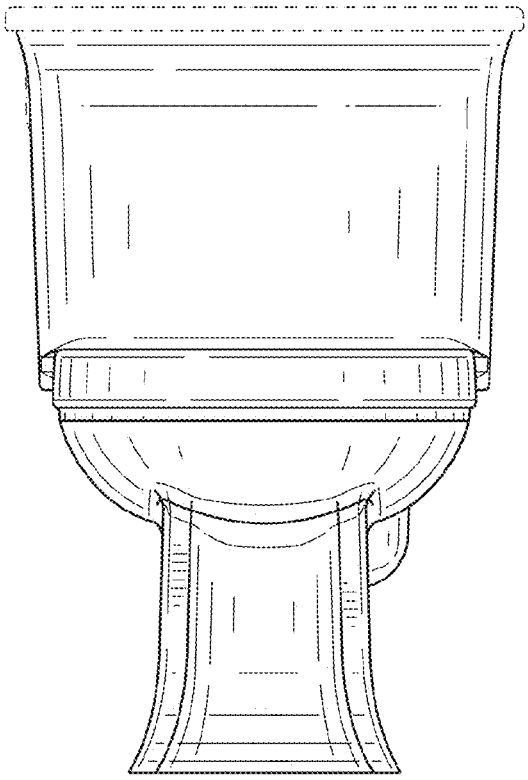
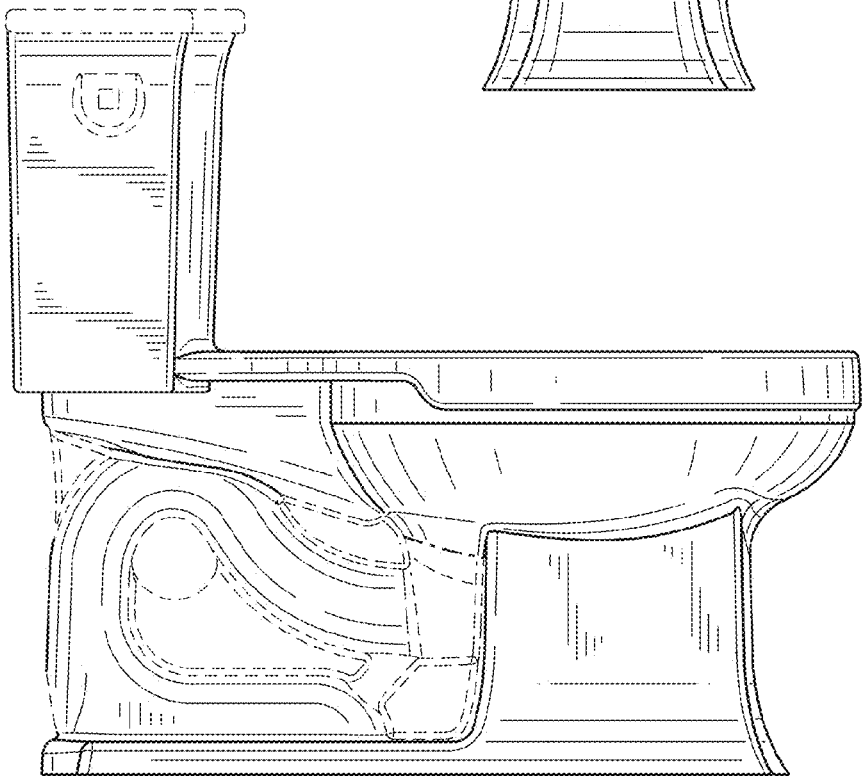
FIG. 4
AMENDED

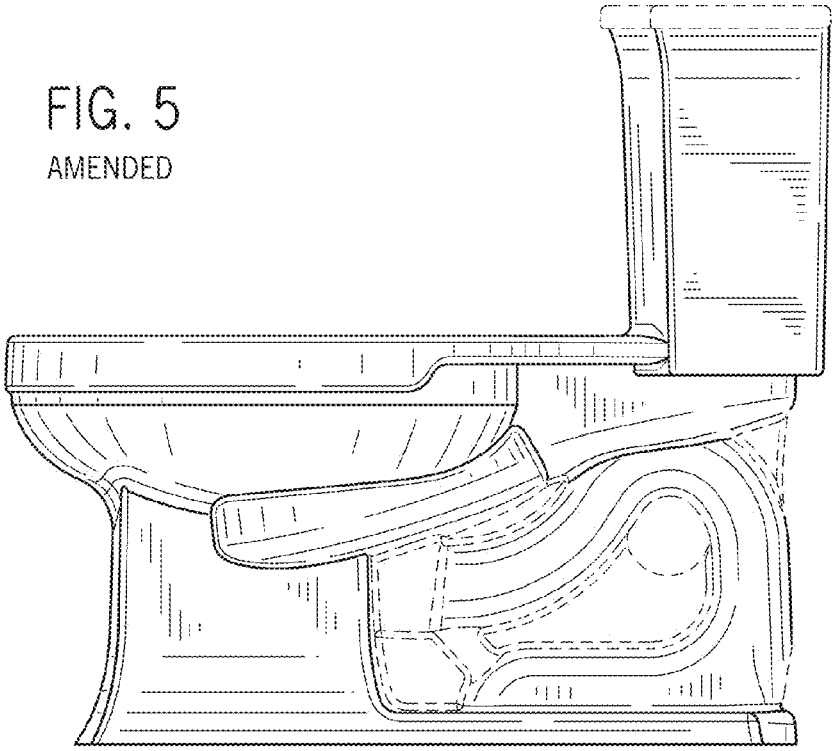

FIG. 5
AMENDED